United States Patent
Freel

(10) Patent No.: US 9,631,145 B2
(45) Date of Patent: *Apr. 25, 2017

(54) RAPID THERMAL CONVERSION OF BIOMASS

(71) Applicant: Ensyn Renewables, Inc., Wilmington, DE (US)

(72) Inventor: Barry A. Freel, Ottawa (CA)

(73) Assignee: Ensyn Renewables, Inc., Wilmington, DE (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/593,831

(22) Filed: Jan. 9, 2015

(65) Prior Publication Data

US 2015/0191656 A1    Jul. 9, 2015

Related U.S. Application Data

(63) Continuation of application No. 13/021,508, filed on Feb. 4, 2011, now Pat. No. 8,961,743, which is a
(Continued)

(51) Int. Cl.
| | |
|---|---|
| *C10B 57/12* | (2006.01) |
| *C10B 57/00* | (2006.01) |
| *C10B 49/22* | (2006.01) |
| *C10B 53/02* | (2006.01) |
| *C10G 1/02* | (2006.01) |
| *C10G 9/28* | (2006.01) |
| *C10K 1/04* | (2006.01) |
| *C10B 27/00* | (2006.01) |
| *F28C 3/08* | (2006.01) |

(52) U.S. Cl.
CPC ............. *C10B 57/00* (2013.01); *C10B 27/00* (2013.01); *C10B 49/22* (2013.01); *C10B 53/02* (2013.01); *C10G 1/02* (2013.01); *C10G 9/28* (2013.01); *C10K 1/04* (2013.01); *F28C 3/08* (2013.01); *Y02E 50/14* (2013.01); *Y02P 20/145* (2015.11)

(58) Field of Classification Search
CPC ...................................... C10B 49/22
USPC ............................... 201/12, 21, 25; 585/240
See application file for complete search history.

(56) References Cited

U.S. PATENT DOCUMENTS

| | | | |
|---|---|---|---|
| 1,252,072 | A | 1/1918 | Abbot |
| 2,205,757 | A | 6/1940 | Wheat |
(Continued)

FOREIGN PATENT DOCUMENTS

| | | |
|---|---|---|
| BR | 8304158 | 7/1984 |
| BR | 8304794 | 4/1985 |
(Continued)

OTHER PUBLICATIONS

AccessScience Dictionary, "ebullating-bed reactor," http://www.accessscience.com, last visited Jul. 15, 2014.
(Continued)

*Primary Examiner* — Nina Bhat
(74) *Attorney, Agent, or Firm* — Jones Day

(57) ABSTRACT

Processes are provided including quenching a hot vapor stream to improve rapid thermal conversion processes for efficiently converting wood, other biomass materials, and other carbonaceous feedstock (including hydrocarbons) into high yields of valuable liquid product, e.g., bio-oil, on a large scale production.

20 Claims, 4 Drawing Sheets

Related U.S. Application Data continuation of application No. 11/943,329, filed on Nov. 20, 2007, now Pat. No. 7,905,990.

(56) References Cited

U.S. PATENT DOCUMENTS

| | | |
|---|---|---|
| 2,326,525 A | 8/1943 | Diwoky |
| 2,328,202 A | 8/1943 | Doerner |
| 2,380,098 A | 7/1945 | Doerner |
| 2,566,353 A | 9/1951 | Mills |
| 3,130,007 A | 4/1964 | Breck |
| 3,309,356 A | 3/1967 | Esterer |
| 3,313,726 A | 4/1967 | Campbell et al. |
| 3,445,549 A | 5/1969 | Kristian |
| 3,467,502 A | 9/1969 | Davis |
| 3,694,346 A | 9/1972 | Blaser et al. |
| 3,696,022 A | 10/1972 | Hutchings |
| 3,776,533 A | 12/1973 | Vlnaty |
| 3,814,176 A | 6/1974 | Seth |
| 3,853,498 A | 12/1974 | Bailie |
| 3,876,533 A | 4/1975 | Myers |
| 3,890,111 A | 6/1975 | Knudsen |
| 3,907,661 A | 9/1975 | Gwyn et al. |
| 3,925,024 A | 12/1975 | Hollingsworth et al. |
| 3,927,996 A | 12/1975 | Knudsen et al. |
| 3,959,420 A | 5/1976 | Geddes et al. |
| 4,003,829 A | 1/1977 | Burger et al. |
| 4,039,290 A | 8/1977 | Inada et al. |
| 4,052,265 A | 10/1977 | Kemp |
| 4,064,018 A | 12/1977 | Choi |
| 4,064,043 A | 12/1977 | Kollman |
| 4,101,414 A | 7/1978 | Kim et al. |
| 4,103,902 A | 8/1978 | Steiner et al. |
| 4,138,020 A | 2/1979 | Steiner et al. |
| 4,153,514 A | 5/1979 | Garrett et al. |
| 4,204,915 A | 5/1980 | Kurata et al. |
| 4,219,537 A | 8/1980 | Steiner |
| 4,233,119 A | 11/1980 | Meyers et al. |
| 4,245,693 A | 1/1981 | Cheng |
| 4,272,402 A | 6/1981 | Mayes |
| 4,300,009 A | 11/1981 | Haag et al. |
| 4,301,771 A | 11/1981 | Jukkola et al. |
| 4,306,619 A | 12/1981 | Trojani |
| 4,308,411 A | 12/1981 | Frankiewicz |
| 4,321,096 A | 3/1982 | Dobbin |
| 4,325,327 A | 4/1982 | Kantesaria et al. |
| 4,336,128 A | 6/1982 | Tamm |
| 4,341,598 A | 7/1982 | Green |
| 4,344,770 A | 8/1982 | Capener et al. |
| 4,364,796 A | 12/1982 | Ishii et al. |
| 4,373,994 A | 2/1983 | Lee |
| 4,415,434 A | 11/1983 | Hargreaves et al. |
| 4,422,927 A | 12/1983 | Kowalczyk |
| 4,434,726 A | 3/1984 | Jones |
| 4,443,229 A | 4/1984 | Sageman et al. |
| 4,456,504 A | 6/1984 | Spars et al. |
| 4,495,056 A | 1/1985 | Venardos et al. |
| 4,504,379 A | 3/1985 | Stuntz et al. |
| 4,548,615 A | 10/1985 | Longchamp et al. |
| 4,552,203 A | 11/1985 | Chrysostome et al. |
| 4,574,743 A | 3/1986 | Claus |
| 4,584,947 A | 4/1986 | Chittick |
| 4,615,870 A | 10/1986 | Armstrong et al. |
| 4,617,693 A | 10/1986 | Meyer et al. |
| 4,645,568 A | 2/1987 | Kurps et al. |
| 4,668,243 A | 5/1987 | Schulz |
| 4,678,860 A | 7/1987 | Kuester |
| 4,710,357 A | 12/1987 | Cetinkaya et al. |
| 4,714,109 A | 12/1987 | Tsao |
| 4,732,091 A | 3/1988 | Gould |
| 4,823,712 A | 4/1989 | Wormer |
| 4,849,091 A | 7/1989 | Cabrera et al. |
| 4,880,473 A | 11/1989 | Scott et al. |
| 4,881,592 A | 11/1989 | Cetinkaya |
| 4,891,459 A | 1/1990 | Knight et al. |
| 4,897,178 A | 1/1990 | Best et al. |
| 4,931,171 A | 6/1990 | Piotter |
| 4,940,007 A | 7/1990 | Hiltunen et al. |
| 4,942,269 A | 7/1990 | Chum et al. |
| 4,968,325 A | 11/1990 | Black et al. |
| 4,987,178 A | 1/1991 | Shibata et al. |
| 4,988,430 A | 1/1991 | Sechrist et al. |
| 5,009,770 A | 4/1991 | Miller et al. |
| 5,011,592 A | 4/1991 | Owen et al. |
| 5,041,209 A | 8/1991 | Cha et al. |
| 5,077,252 A | 12/1991 | Owen et al. |
| 5,093,085 A | 3/1992 | Engstrom et al. |
| 5,136,117 A | 8/1992 | Paisley et al. |
| 5,225,044 A | 7/1993 | Breu |
| 5,236,688 A | 8/1993 | Watanabe et al. |
| 5,243,922 A | 9/1993 | Rehmat et al. |
| 5,281,727 A | 1/1994 | Carver et al. |
| 5,326,919 A | 7/1994 | Paisley et al. |
| 5,371,212 A | 12/1994 | Moens |
| 5,376,340 A | 12/1994 | Bayer et al. |
| 5,380,916 A | 1/1995 | Rao |
| 5,407,674 A | 4/1995 | Gabetta et al. |
| 5,426,807 A | 6/1995 | Grimsley et al. |
| 5,478,736 A | 12/1995 | Nair |
| 5,520,722 A | 5/1996 | Hershkowitz et al. |
| 5,578,092 A | 11/1996 | Collin |
| 5,605,551 A | 2/1997 | Scott et al. |
| 5,654,448 A | 8/1997 | Pandey et al. |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |
| 5,788,784 A | 8/1998 | Koppenhoefer et al. |
| 5,792,340 A * | 8/1998 | Freel .................. C10B 49/20 201/12 |
| 5,853,548 A | 12/1998 | Piskorz et al. |
| 5,879,642 A | 3/1999 | Trimble et al. |
| 5,879,650 A | 3/1999 | Kaul et al. |
| 5,961,786 A | 10/1999 | Freel et al. |
| 5,969,165 A | 10/1999 | Liu |
| 6,002,025 A | 12/1999 | Page et al. |
| 6,106,702 A | 8/2000 | Sohn et al. |
| 6,113,862 A | 9/2000 | Jorgensen et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,339,182 B1 | 1/2002 | Munson et al. |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,743,746 B1 | 6/2004 | Prilutsky et al. |
| 6,759,562 B2 | 7/2004 | Gartside et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,226,954 B2 | 6/2007 | Tavasoli et al. |
| 7,240,639 B2 | 7/2007 | Hyppaenen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |

(56) References Cited

U.S. PATENT DOCUMENTS

| | | | |
|---|---|---|---|
| 7,572,362 B2 | 8/2009 | Freel et al. | |
| 7,578,927 B2 | 8/2009 | Marker et al. | |
| 7,625,432 B2 | 12/2009 | Gouman et al. | |
| 7,897,124 B2 | 3/2011 | Gunnerman et al. | |
| 7,905,990 B2 * | 3/2011 | Freel | C10B 49/22 201/12 |
| 7,943,014 B2 | 5/2011 | Berruti et al. | |
| 7,956,224 B2 | 6/2011 | Elliott et al. | |
| 7,960,598 B2 | 6/2011 | Spilker et al. | |
| 7,982,075 B2 | 7/2011 | Marker et al. | |
| 7,998,315 B2 | 8/2011 | Bridgwater et al. | |
| 7,998,455 B2 | 8/2011 | Abbas et al. | |
| 7,999,142 B2 | 8/2011 | Kalnes et al. | |
| 7,999,143 B2 | 8/2011 | Marker et al. | |
| 8,043,391 B2 | 10/2011 | Dinjus et al. | |
| 8,097,216 B2 | 1/2012 | Beech et al. | |
| 8,147,766 B2 | 4/2012 | Spilker et al. | |
| 8,153,850 B2 | 4/2012 | Hall et al. | |
| 8,202,332 B2 | 6/2012 | Agblevor | |
| 8,207,385 B2 | 6/2012 | O'Connor et al. | |
| 8,277,643 B2 | 10/2012 | Huber et al. | |
| 8,524,087 B2 | 9/2013 | Frey et al. | |
| 8,961,743 B2 * | 2/2015 | Freel | C10B 49/22 202/108 |
| 2002/0146358 A1 | 10/2002 | Smith et al. | |
| 2003/0202912 A1 | 10/2003 | Myohanen et al. | |
| 2005/0167337 A1 | 8/2005 | Bunger et al. | |
| 2005/0209328 A1 | 9/2005 | Allgcod et al. | |
| 2006/0016723 A1 | 1/2006 | Tang et al. | |
| 2006/0074254 A1 | 4/2006 | Zhang et al. | |
| 2006/0180060 A1 | 8/2006 | Crafton et al. | |
| 2006/0264684 A1 | 11/2006 | Petri et al. | |
| 2007/0000809 A1 | 1/2007 | Lin et al. | |
| 2007/0141222 A1 | 6/2007 | Binder et al. | |
| 2007/0205139 A1 | 9/2007 | Kulprathipanja et al. | |
| 2007/0272538 A1 | 11/2007 | Satchell | |
| 2008/0029437 A1 | 2/2008 | Umansky et al. | |
| 2008/0035526 A1 | 2/2008 | Hedrick et al. | |
| 2008/0050792 A1 | 2/2008 | Zmierczak et al. | |
| 2008/0051619 A1 | 2/2008 | Kulprathipanja et al. | |
| 2008/0081006 A1 | 4/2008 | Myers et al. | |
| 2008/0086937 A1 | 4/2008 | Hazlebeck et al. | |
| 2008/0161615 A1 | 7/2008 | Chapus et al. | |
| 2008/0171649 A1 | 7/2008 | Jan et al. | |
| 2008/0185112 A1 | 8/2008 | Argyropoulos | |
| 2008/0193345 A1 | 8/2008 | Lott et al. | |
| 2008/0194896 A1 | 8/2008 | Brown et al. | |
| 2008/0199821 A1 | 8/2008 | Nyberg et al. | |
| 2008/0236043 A1 | 10/2008 | Dinjus et al. | |
| 2008/0264771 A1 | 10/2008 | Dam-Johansen et al. | |
| 2008/0274017 A1 | 11/2008 | Boykin et al. | |
| 2008/0274022 A1 | 11/2008 | Boykin et al. | |
| 2008/0282606 A1 | 11/2008 | Plaza et al. | |
| 2008/0312476 A1 | 12/2008 | McCall | |
| 2008/0318763 A1 | 12/2008 | Anderson | |
| 2009/0008292 A1 | 1/2009 | Keusenkothen et al. | |
| 2009/0077867 A1 | 3/2009 | Marker et al. | |
| 2009/0077868 A1 | 3/2009 | Brady et al. | |
| 2009/0078557 A1 | 3/2009 | Tokarz | |
| 2009/0078611 A1 | 3/2009 | Marker et al. | |
| 2009/0082603 A1 | 3/2009 | Kalnes et al. | |
| 2009/0082604 A1 | 3/2009 | Agrawal et al. | |
| 2009/0084666 A1 | 4/2009 | Agrawal et al. | |
| 2009/0090046 A1 | 4/2009 | O'Connor et al. | |
| 2009/0090058 A1 | 4/2009 | Dam-Johansen et al. | |
| 2009/0113787 A1 | 5/2009 | Elliott et al. | |
| 2009/0139851 A1 | 6/2009 | Freel | |
| 2009/0165378 A1 | 7/2009 | Agblevor | |
| 2009/0188158 A1 | 7/2009 | Morgan | |
| 2009/0193709 A1 | 8/2009 | Marker et al. | |
| 2009/0227823 A1 | 9/2009 | Huber et al. | |
| 2009/0250376 A1 | 10/2009 | Brandvold et al. | |
| 2009/0253947 A1 | 10/2009 | Brandvold et al. | |
| 2009/0253948 A1 | 10/2009 | McCall et al. | |
| 2009/0259082 A1 | 10/2009 | Deluga et al. | |
| 2009/0283442 A1 | 11/2009 | McCall et al. | |
| 2009/0287029 A1 | 11/2009 | Anumakonda et al. | |
| 2009/0293344 A1 | 12/2009 | O'Brien et al. | |
| 2009/0294324 A1 | 12/2009 | Brandvold et al. | |
| 2009/0301930 A1 | 12/2009 | Brandvold et al. | |
| 2009/0308787 A1 | 12/2009 | O'Connor et al. | |
| 2009/0318737 A1 | 12/2009 | Luebke | |
| 2009/0321311 A1 | 12/2009 | Marker et al. | |
| 2010/0043634 A1 | 2/2010 | Shulfer et al. | |
| 2010/0147743 A1 | 6/2010 | MacArthur et al. | |
| 2010/0151550 A1 | 6/2010 | Nunez et al. | |
| 2010/0162625 A1 | 7/2010 | Mills | |
| 2010/0163395 A1 | 7/2010 | Henrich et al. | |
| 2010/0325954 A1 | 12/2010 | Tiwari et al. | |
| 2011/0113675 A1 | 5/2011 | Fujiyama et al. | |
| 2011/0123407 A1 | 5/2011 | Freel | |
| 2011/0132737 A1 | 6/2011 | Jadhav | |
| 2011/0139597 A1 | 6/2011 | Lin | |
| 2011/0146135 A1 | 6/2011 | Brandvold | |
| 2011/0146140 A1 | 6/2011 | Brandvold et al. | |
| 2011/0146141 A1 | 6/2011 | Frey et al. | |
| 2011/0146145 A1 | 6/2011 | Brandvold et al. | |
| 2011/0201854 A1 | 8/2011 | Kocal et al. | |
| 2011/0258914 A1 | 10/2011 | Banasiak et al. | |
| 2012/0205289 A1 | 8/2012 | Joshi | |
| 2012/0279825 A1 | 11/2012 | Freel et al. | |
| 2012/0317871 A1 | 12/2012 | Frey et al. | |

FOREIGN PATENT DOCUMENTS

| | | |
|---|---|---|
| CA | 1312497 | 1/1993 |
| CA | 2299049 | 12/2000 |
| CA | 2521829 | 3/2006 |
| CN | 1377938 | 11/2002 |
| CN | 101045524 | 10/2007 |
| CN | 101294085 | 10/2008 |
| CN | 101318622 | 12/2008 |
| CN | 101381611 | 3/2009 |
| CN | 101544901 | 9/2009 |
| CN | 101550347 | 10/2009 |
| EP | 105980 | 1/1986 |
| EP | 578503 | 1/1994 |
| EP | 676023 | 7/1998 |
| EP | 718392 | 9/1999 |
| EP | 787946 | 6/2000 |
| EP | 1420058 | 5/2004 |
| GB | 1019133 | 2/1966 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| SE | 9903742-6 | 1/2004 |
| WO | 91/11499 | 8/1991 |
| WO | 92/07842 | 5/1992 |
| WO | 92/18492 | 10/1992 |
| WO | 94/13827 | 6/1994 |
| WO | 97/44410 | 11/1997 |
| WO | 01/09243 | 2/2001 |
| WO | 01/83645 | 11/2001 |
| WO | 2007/017005 | 2/2007 |
| WO | 2007/045093 | 4/2007 |
| WO | 2007/050030 | 5/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/099684 | 8/2009 |
| WO | 2009/118357 | 10/2009 |
| WO | 2009/118363 | 10/2009 |

(56) References Cited

FOREIGN PATENT DOCUMENTS

| | | |
|---|---|---|
| WO | 2009/126508 | 10/2009 |
| WO | 2012/009207 | 1/2012 |

OTHER PUBLICATIONS

Adam, J. "Catalytic conversion of biomass to produce higher quality liquid bio-fuels," *PhD Thesis*, Department of Energy and Process Engineering, The Norwegian University of Science and Technology, Trondheim (2005).
Adam, J. et al. "Pyrolysis of biomass in the presence of Al-MCM-41 type catalysts," *Fuel*, 84 (2005) 1494-1502.
Adjaye, John D. et al. "Catalytic conversion of a biomass-derived oil to fuels and chemicals I: Model compound studies and reaction pathways," *Biomass & Bioenergy*, 8:3 (1995) 131-149.
Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.
Adjaye, John D. et al. "Catalytic conversion of wood derived bio-oil to fuels and chemicals," *Studies in Surface Science and Catalysis*, 73 (1992) 301-308.
Adjaye, John D. et al. "Production of hydrocarbons by the catalytic upgrading of a fast pyrolysis bio-oil," *Fuel Process Technol*, 45:3 (1995) 161-183.
Adjaye, John D. et al. "Upgrading of a wood-derived oil over various catalysts," *Biomass & Bioenergy*, 7:1-6 (1994) 201-211.
Aho, A. et al. "Catalytic pyrolysis of woody biomass in a fluidized bed reactor; Influence of zeolites structure, Science Direct," *Fuel*, 87 (2008) 2493-2501.
Antonakou, E. et al. "Evaluation of various types of Al-MCM-41 materials as catalysts in biomass pyrolysis for the production of bio-fuels and chemicals," *Fuel*, 85 (2006) 2202-2212.
Atutxa, A. et al. "Kinetic Description of the Catalytic Pyrolysis of Biomass in a Conical Spouted Bed Reactor," *Energy Fuels*, 19:3 (2005) 765-774.
Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.
Baldauf, W. et al. "Upgrading of flash pyrolysis oil and utilization in refineries," *Biomass & Bioenergy*, 7 (1994) 237-244.
Baumlin, "The continuous self stirred tank reactor: measurement of the cracking kinetics of biomass pyrolysis vapours," *Chemical Engineering Science*, 60 (2005) 41-55.
Berg, "Reactor Development for the Ultrapyrolysis Process," *The Canadian Journal of Chemical Engineering*, 67 (1989) 96-101.
Bielansky, P. et al. "Catalytic conversion of vegetable oils in a continuous FCC pilot plant," *Fuel Processing Technology*, 92 (2011) 2305-2311.
Bimbela, F. et al. "Hydrogen production by catalytic steam reforming of acetic acid, a model compound of biomass pyrolysis liquids," *J. Ana App. Pyrolysis*, 79 (2007) 112-120.
Bridgwater et al. (eds) *Fast Pyrolysis of Biomass: A Handbook*, Newbury Cpl Press, Great Britain (2002) 12-13.
Bridgwater, A.V. "Principles and practices of biomass fast pyrolysis processes for liquids," *Journal of Analytical and Applied Pyrolysis*, 51 (1999) 3-22.
Bridgwater, Tony "Production of high grade fuels and chemicals from catalytic pyrolysis of biomass," *Catalysis Today*, 29 (1996) 285-295.
Bridgwater, Tony et al. "Transport fuels from biomass by thermal processing," *EU-China Workshop on Liquid Biofuels*, Beijing, China (Nov. 4-5, 2004).
Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).
Carlson, T. et al. "Aromatic Production from Catalytic Fast Pyrolysis of Biomass-Derived Feedstocks," *Top Catal*, 52 (2009) 241-242.
Carlson., T. et al. "Green Gasoline by Catalytic Fast Pyrolysis of Solid Biomass Derived Compounds," *ChemSusChem*, 1 (2008) 397-400.
Cass et al. "Challenges in the Isolation of Taxanes from *Taxus canadensis* by Fast Pyrolysis," *J Analytical and Applied Pyrolysis* 57 (2001) 275-285.
Chantal, P. D. et al. "Production of Hydrocarbons from Aspen Poplar Pyrolytic Oils over H-ZSM5," *Applied Catalysis*, 10 (1984) 317-332.
Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.
Chinsuwan, A. et al. "An experimental investigation of the effect of longitudinal fin orientation on heat transfer in membrane water wall tubes in a circulating fluidized bed," *International Journal of Heat and Mass Transfer*, 52:5-6 (2009) 1552-1560.
Cornelissen, T. et al., "Flash co-pyrolysis of biomass with polylactic acid. Part 1: Influence on bio-oil yield and heating value," *Fuel* 87 (2008) 1031-1041.
Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.
Cragg et al. "The Search for New Pharmaceutical Crops: Drug Discovery and Development at the National Cancer Institute," in Janick, J. and Simon, J.E. (eds) *New Crops*, Wiley, New York (1993) 161-167.
Czernik, S. et al. "Hydrogen from biomass-production by steam reforming of biomass pyrolysis oil," *Catalysis Today*, 129 (2007) 265-168.
Czernik, S. et al. "Hydrogren by Catalytic Steam Reforming of Liquid Byproducts from Biomass Thermoconversion Processes," *Ind. Eng. Chem. Res.*, 41 (2002) 4209-4215.
Dahmen, "Rapid pyrolysis for the pretreatment of biomass and generation of bioslurry as intermediate fuel", *Chemie—Ingenieur-Technik*, 79:9 (2007) 1326-1327. Language: German (Abstract only; Machine translation of Abstract).
Dandik, "Catalytic Conversion of Used Oil to Hydrocarbon Fuels in a Fractionating Pyrolysis Reactor," *Energy & Fuels*, 12 (1998) 1148-1152.
Daoust et al. "Canada Yew (*Taxus canadensis marsh.*) and Taxanes: a Perfect Species for Field Production and Improvement through Genetic Selection," Natural Resources Canada, Canadian Forest Service, Sainte-Fov, Quebec (2003).
de Wild, P. et al. "Lignin valorisation for chemicals and (transportation) fuels via (catalytic) pyrolysis and hydrodeoxygenation," *Environ. Prog. Sustainable Energy*, 28 (2009) 461-469.
Demirbas, Ayhan "Fuel Conversional Aspects of Palm Oil and Sunflower Oil," *Energy Sources*, 25 (2003) 457-466.
Di Blasi, C. et al. "Effects of Potassium Hydroxide Impregnation of Wood Pyrolysis, American Chemical Society," *Energy & Fuels* 23 (2009) 1045-1054.
Ellioti, D. "Historical Developments in Hydroprocessing Bio-oils," *Energy & Fuels*, 21 (2007) 1792-1815.
Ensyn Technologies Inc. "Catalytic de-oxygenation of biomass-derived RTP vapors." Prepared for ARUSIA, Agenzia Regionale Umbria per lo Sviluppo e L'Innovazione, Perguia, Italy (Mar. 1997).
Filtration, Kirk-Othmer Encyclopedia of Chemical Technology 5th Edition. vol. 11., John Wiley & Sons, Inc., Feb. 2005.
Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.
Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.
Gevert, Börjie S. et al. "Upgrading of directly liquefied biomass to transportation fuels: catalytic cracking," *Biomass* 14:3 (1987) 173-183.
Goesele, W. et al., Filtration, Wiley-VCH Verlag GmbH & Co. KGaA, Weinheim, 10.1002/14356007.b02 Oct. 2005.

(56) References Cited

OTHER PUBLICATIONS

Grange, P. et al. "Hydrotreatment of pyrolysis oils from biomass: reactivity of the various categories of oxygenated compounds and preliminary techno-economical study," *Catalysis Today*, 29 (1996) 297-301.
Hama, "Biodiesel-fuel production in a packed-bed reactor using lipase-producing Rhizopus oryzae cells immobilized within biomass support particles", *Biochemical Engineering Journal*, 34 (2007) 273-278.
Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.
Holton et al. "First Total Synthesis of Taxol. 2. Completion of the C and D Rings," *J Am Chem Soc*, 116 (1994) 1599-1600.
Horne, Patrick A. et al. "Catalytic coprocessing of biomass-derived pyrolysis vapours and methanol," *J. Analytical and Applied Pyrolysis*, 34:1 (1995) 87-108.
Horne, Patrick A. et al. "Premium quality fuels and chemicals from the fluidised bed pyrolysis of biomass with zeolite catalyst upgrading," *Renewable Energy*, 5:5-8 (1994) 810-812.
Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.
Huang et al. "New Taxanes from *Taxus brevifolia*," *J of Natural Products*, 49 (1986) 665-669.
Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).
Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).
Hughes, J. et al. "Structural variations in natural F, OH and Cl apatites," *American Mineralogist*, 74 (1989) 870-876.
Huie, C. W. "A review of modern sample-preparation techniques for the extraction and analysis of medicinal plants," *Anal Bioanal Chem*, 373 (2002) 23-30.
International Search Report dated Feb. 22, 2013 for corresponding International Application No. PCT/US2012/68876.
Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.
Iojoiu, E. et al. "Hydrogen production by sequential cracking of biomass-derived pyrolysis oil over noble metal catalysts supported on ceria-zirconia," *Applied Catalysis A: General*, 323 (2007) 147-161.
Jackson, M. et al. "Screening heterogenous catalysts for the pyrolysis of lignin," *J. Anal. Appl. Pyrolysis*, 85 (2009) 226-230.
Junming et al. "Bio-oil upgrading by means of ethyl ester production in reactive distillation to remove water and to improve storage and fuel characteristics," *Biomass and Energy*, 32 (2008) 1056-1061.
Kalnes, Tom et al. "Feedstock Diversity in the Refining Industry," UOP Report to NREL and DOE (2004).
Khanal, "Biohydrogen Production in Continuous-Flow Reactor Using Mixed Microbial Culture," *Water Environment Research*, 78:2 (2006) 110-117.
Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.
Kingston et al. "New Taxanes from *Taxus brevifolia*," *J of Natural Products*, 45 (1982) 466-470.
Lappas, A. A. et al. "Biomass pyrolysis in a circulating fluid bed reactor for the production of fuels and chemicals," *Fuel*, 81 (2002) 2087-2095.
Lappas, A.A. et al. "Production of Transportation Fuels from Biomass," *Workshop of Chemical Process Engineering Research Institute/Center for Research and Technology Hellas*, Thermi-Thessaloniki, Greece (2004).
Lappas, A.A., "Production of biofuels via co-processing in conventional refining process," *Catalysis Today*, 145 (2009) 55-62.
Maiti, R.N. et al. "Gas-liquid distributors for trickle-bed reactors: A review"; *Industrial and Engineering Chemistry Research*, 46:19 (2007) 6164-6182.
Mancosky, "The use of a controlled cavitation reactor for bio-diesel production," (abstract only), AIChE Spring National Meeting 2007, Houston, Texas.
Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).
Marker, Terry L., et al., UOP, "Opportunities for Biorenewables in Oil Refineries," Final Technical Report, U.S. Department of Energy Award No. DE-FG36-05G015085, Report No. DOEGO15085Final (2005).
Marquevich, "Hydrogen from Biomass: Steam Reforming of Model Compounds of Fast-Pyrolysis Oil," *Energy & Fuels*, 13 (1999) 1160-1166.
Masoumifard, N. et al. "Investigation of heat transfer between a horizontal tube and gas-solid fluidized bed," *International Journal of Heat and Fluid Flow*, 29:5 (2008) 1504-1511.
McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana zucc,*" *J Org Chem*, 46 (1981) 1469-1474.
Mohan, D. et al. "Pyrolysis of Wood/Biomass for Bio-oil: A Critical Review," *Energy Fuels*, 20:3 (2006) 848-849.
Newton "Taxol: A Case Study in Natural Products Chemistry," Lecture Notes, University of Southern Maine, http:/www.usm.maine.edu/ (2009) 1-6.
Nicolaou et al. "Total Synthesis of Taxol," *Nature*, 367 (1994) 630-634.
Nowakowski, D. et al. "Potassium catalysis in the pyrolysis behaviour of short rotation willow coppice," *Fuels*, 86 (2007) 2389-2402.
Ognisty, T. P. "The direct contact heat transfer performance of a spray nozzle, a notched through distributor, and two inch Pall rings," AIChE 1990 Spring National Meeting (Orlando Mar. 18-22, 1990) Preprint N. 37c 36P, Mar. 18, 1990.
Ohman "Bed Agglomeration Characteristics during Fluidized Bed Combustion of Biomass Fuels," *Energy & Fuels*, 14 (2000) 169-178.
Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.
Olazar, M. et al. "Pyrolysis of Sawdust in a Conical Spouted-Bed Reactor with a HZSM-5 Catalyst," *AIChE Journal*, 46:5 (2000) 1025-1033.
Onay "Influence of pyrolysis temperature and heating rate on the production of bio-oil and char from safflower seed by pyrolysis, using a well-swept fixed-bed reactor," *Fuel Processing Technology*, 88 (2007) 523-531.

(56) References Cited

OTHER PUBLICATIONS

Onay, "Production of Bio-Oil from Biomass: Slow Pyrolysis of Rapeseed (*Brassica napus* L.) in a Fixed-Bed Reactor," *Energy Sources*, 25 (2003) 879-892.
Ong et al. "Pressurized hot water extraction of bioactive or marker compounds in botanicals and medicinal plant materials," *J Chromatography A*, 1112 (2006) 92-102.
Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.
Otterstedt, J. E. et al. "Catalytic Cracking of Heavy Oils," in Occelli, Mario L. (ed) Fluid Catalytic Cracking, Chapter 17, ACS, Washington, DC (1988) 266-278.
Padmaja, K.V. et al. "Upgrading of Candelilla biocrude to hydrocarbon fuels by fluid catalytic cracking," *Biomass and Bioenergy*, 33 (2009) 1664-1669.
Pavia et al., Intro to Org Labo Techniques (1988) 3d ed. Saunders College Publishing, Washington p. 62-66, 541-587.
PCT/US2012/055384 International Search Report, dated Mar. 28, 2013, and International Preliminary Report on Patentability, dated Mar. 25, 2014.
Pecora, A.A.B. et al., "Heat transfer coefficient in a shallow fluidized bed heat exchanger with a continuous flow of solid particles," *Journal of the Brazilian Society of Mechanical Sciences and Engineering*, 28:3 (2006) 253-258.
Pecora, A.A.B., et al., "An analysis of process heat recovery in a gas-solid shallow fluidized bed," *Brazilian Journal of Chemical Engineering*, 23:4 (2006) 497-506.
Petrik, P.T. et al. "Heat exchange in condensation of R227 coolant on inclined tubes placed in a granular Bed," *Journal of Engineering Physics and Thermophysics*, 77:4 (2004) 758-761.
Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.
Prins, Wolter et al. "Progress in fast pyrolysis technology," *Topsoe Catalysis Forum* 2010, Munkerupgaard, Denmark (Aug. 19-20, 2010).
Radlein, D. et al, "Hydrocarbons from the Catalytic Pyrolysis of Biomass," *Energy & Fuels*, 5 (1991) 760-763.
Rao "Taxol and Related Taxanes. I. Taxanes of *Taxus brevifolia* bark," *Pharm Res* 10:4 (1993) 521-524.
Rao et al. "A New Large-Scale Process for Taxol and Related Taxanes from *Taxus brevifolia*," *Pharm Res*, 12:7 (1995) 1003-1010.
Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.
Rodriguez, O.M.H. et al. "Heat recovery from hot solid particles in a shallow fluidized bed," *Applied Thermal Engineering*, 22:2 (2002) 145-160.
Samolada, M. C. et al. "Production of a bio-gasoline by upgrading biomass flash pyrolysis liquids via hydrogen processing and catalytic cracking," *Fuel*, 77:14 (1998) 1667-1674.
Sang "Biofuel Production from Catalytic Cracking of Palm Oil," *Energy Sources*, 25 (2003) 859-869.
Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.
Scott, D. et al. *Pretreatment of poplar wood for fast pyrolysis: rate of cation removal, Journal of Analytical and Applied Pyrolysis*, 57 (2000) 169-176.
Senilh et al. "Mise en Evidence de Nouveaux Analogues du Taxol Extraits de *Taxus baccata*," *J of Natural Products*, 47 (1984) 131-137. (English Abstract included).
Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.
Sharma, R. K. et al. "Catalytic Upgrading of Pyrolysis Oil," *Energy & Fuels*, 7 (1993) 306-314.
Sharma, R. K. et al. "Upgrading of wood-derived bio-oil over HZSM-5," *Bioresource Technology*, 35:1 (1991) 57-66.
Smith R.M. "Extractions with superheated water," *J Chromatography A*, 975 (2002) 31-46.
Snader "Detection and Isolation," in Suffness, M. (ed) *Taxol-Science and Applications*, CRC Press, Boca Raton, Florida (1995) 277-286.
Srinivas, S.T. et al "Thermal and Catalytic Upgrading of a Biomass-Derived Oil in a Dual Reaction System," *Can. J. Chem. Eng.*, 78 (2009) 343-354.
Stierle et al. "The Search for Taxol-Producing Microorganism Among the Endophytic Fungi of the Pacific Yew, *Taxus brevifolia*," *J of Natural Products*, 58 (1995) 1315-1324.
Stojanovic, B. et al. "Experimental investigation of thermal conductivity coefficient and heat exchange between fluidized bed and inclined exchange surface," *Brazilian Journal of Chemical Engineering*, 26:2 (2009) 343-352.
Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).
Twaiq, A. A. et al. "Performance of composite catalysts in palm oil cracking for the production of liquid fuels and chemicals," *Fuel Processing Technology*, 85 (2004) 1283-1300.
Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.
Tyson, K. et al. "Biomass Oil Analysis: Research Needs and Recommendations," National Renewable Energy Laboratory, Report No. NREL/TP-510-34796 (Jun. 2004).
Valle, B. et al. "Integration of Thermal Treatment and Catalytic Transformation for Upgrading Biomass Pyrolysis Oil," *International Journal of Chemical Reactor Engineering*, 5:1 (2007).
Vasanova, L.K. "Characteristic features of heat transfer of tube bundles in a cross water-air flow and a three-phase fluidized bed," *Heat Transfer Research*, 34:5-6 (2003) 414-420.
Vitolo, S. et al. "Catalytic upgrading of pyrolytic oils over HZSM-5 zeolite: behaviour of the catalyst when used in repeated upgrading-regenerating cycles," *Fuel*, 80 (2001) 17-26.
Vitolo, S. et al. "Catalytic upgrading of pyrolytic oils to fuel over different zeolites," *Fuel*, 78:10 (1999) 1147-1159.
Wang, Xianhua et al., "The Influence of Microwave Drying on Biomass Pyrolysis," *Energy & Fuels* 22 (2008) 67-74.
Westerhof, Roel J. M. et al., "Controlling the Water Content of Biomass Fast Pyrolysis Oil," *Ind. Eng. Chem. Res.* 46 (2007) 9238-9247.
Williams, Paul T. et al. "Characterisation of oils from the fluidised bed pyrolysis of biomass with zeolite catalyst upgrading," *Biomass and Bioenergy*, 7:1-6 (1994) 223-236.
Williams, Paul T. et al. "Comparison of products from the pyrolysis and catalytic pyrolysis of rice husks," *Energy*, 25:6 (2000) 493-513.
Williams, Paul T. et al. "The influence of catalyst type on the composition of upgraded biomass pyrolysis oils," *J Analytical and Applied Pyrolysis*, 31 (1995) 39-61.
Yukimune et al. "Methyl Jasmonate-induced Overproduction of Paclitaxel and Baccatin III in Taxus Cell Suspension Cultures," *Nature Biotechnology* 14 (1996) 1129-1132.
Zhang et al. "Investigation on initial stage of rapid pyrolysis at high pressure using Taiheiyo coal in dense phase," *Fuel*, 81:9 (2002) 1189-1197.
Zhang, "Hydrodynamics of a Novel Biomass Autothermal Fast Pyrolysis Reactor: Flow Pattern and Pressure Drop," *Chem. Eng. Technol.*, 32:1 (2009) 27-37.
Graham, R.G. et al. "Thermal and Catalytic Fast Pyrolysis of Lignin by Rapid Thermal Processing (RTP)," Seventh Canadian Bioenergy R&D Seminar, Skyline Hotel, Ottawa, Ontario, Canada, Apr. 24-26, 1989.

\* cited by examiner

FIG. 4

| Ex# | Collection Column | Bio-Oil Recovery Distribution (%) | Water Content (wt%) | Viscosity @70C (cST) | Density @ 25C (g/cm3) | NRP Content (wt%) | HA Content (wt/vol %) | Acid Content (weak) (dry wt%) | Higher Heating Value (MJ/kg) | Acetone/ THF Content (wt%) |
|---|---|---|---|---|---|---|---|---|---|---|
| 1 | Primary | 70.9 | 35 | 3.4 | 1.1814 | 13.9 | 6.25 | | 13.4 | |
|   | Secondary | 29.1 | 24.6 | 17.9 | 1.2313 | 45.9 | 1.88 | | 18.2 | |
| 2 | Primary | 71.2 | 35.2 | 2.7 | 1.1824 | 16.5 | 6.33 | 10.9 | 13.6 | 0.1 |
|   | Secondary | 28.8 | 19.3 | 28.8 | 1.2475 | 47.8 | 2.05 | 7.8 | 18.7 | 0.3 |
| 3 | Primary | 65.3 | 34.1 | 4.5 | 1.9998 | 18 | 5.89 | | 14.6 | |
|   | Secondary | 34.7 | 30.1 | 10.6 | 1.2127 | 43.4 | 1.92 | | 16.4 | |
| 4 | Primary | 66.6 | 34.4 | 3.9 | 1.1904 | 15.7 | 6.15 | | 14.3 | |
|   | Secondary | 33.4 | 23.7 | 16 | 1.2252 | 47.2 | 1.93 | | 16.7 | |
| 5 | Primary | 80.1 | 29.6 | 3.8 | 1.193 | 15.8 | 6.03 | 10.4 | 14.5 | 1.1 |
|   | Secondary | 19.9 | 19.6 | 23.8 | 1.2437 | 42.3 | 1.78 | 6.4 | 18.3 | 0.2 |
| 6 | Primary | 64.5 | 24.5 | 5.8 | 1.2133 | 19.5 | 6.86 | | 15.5 | |
|   | Secondary | 35.5 | 27.9 | 11.5 | 1.2156 | 43.7 | 1.64 | | 16.6 | |
| 7 | Primary | 67.3 | 30.1 | 4.6 | 1.203 | 17.6 | 6.67 | | 15.2 | |
|   | Secondary | 32.7 | 26.7 | 12.3 | 1.2219 | 52.5 | 1.76 | | 16.7 | |
| 8 | Primary | 65.1 | 33.7 | 3.6 | 1.1887 | 16.2 | 6.3 | 10.2 | 14.3 | 1.2 |
|   | Secondary | 34.9 | 20.2 | 27.9 | 1.2504 | 39.6 | 1.7 | 8 | 19 | 0.3 |
| 9 | Primary | 62.8 | 27.9 | 5.3 | 1.2065 | 20.8 | 6.4 | | 14.5 | |
|   | Secondary | 37.2 | 28.5 | 10 | 1.208 | 44.1 | 1.74 | | 15.8 | |

RAPID THERMAL CONVERSION OF BIOMASS

CROSS-REFERENCE TO RELATED APPLICATIONS

This application is a continuation of U.S. patent application Ser. No. 13/021,508, filed Feb. 4, 2011, which is further a continuation of U.S. patent application Ser. No. 11/943,329, filed Nov. 20, 2007, now U.S. Pat. No. 7,905,990, granted Mar. 15, 2011. All of the foregoing related applications, in their entirety, are fully incorporated herein by reference.

FIELD OF THE INVENTION

The present invent relates to the rapid thermal conversion of wood and/or other biomass into high yields of valuable liquid product, e.g., bio-oil.

BACKGROUND OF THE INVENTION

Biomass has been the primary source of energy over most of human history. During the 1800's and 1900's the proportion of the world's energy sourced from biomass dropped sharply, as the economical development of fossil fuels occurred, and markets for coal and petroleum products took over. Nevertheless, some 15% of the world's energy continues to be sourced from biomass, and in the developing world, the contribution of biomass to the energy supply is close to 38%.

Solid biomass, typically wood and wood residues, is converted to useful products, e.g., fuels or chemicals, by the application of heat. The most common example of thermal conversion is combustion, where air is added and the entire biomass feed material is burned to give hot combustion gases for the production of heat and steam. A second example is gasification, where a small portion of the biomass feedstock is combusted with air in order to convert the rest of the biomass into a combustible fuel gas. The combustible gas, known as producer gas, behaves like natural gas but typically has between 10 and 30% of the energy content of natural gas. A final example of thermal conversion is pyrolysis where the solid biomass is converted to liquid and char, along with a gaseous by-product, essentially in the absence of air.

In a generic sense, pyrolysis is the conversion of biomass to a liquid and/or char by the action of heat, normally without using direct combustion in a conversion unit. A small quantity of combustible gas is also a typical by-product. Historically, pyrolysis was a relatively slow process where the resulting liquid product was a viscous tar and a "pyrolygneous" liquor. Conventional slow pyrolysis has typically taken place at temperatures below 400° C. and at processing times ranging from several seconds to minutes. The processing times can be measured in hours for some slow pyrolysis processes used for charcoal production.

A more modern form of pyrolysis, termed fast pyrolysis, was discovered in the late 1970's when researchers noted that an extremely high yield of a light pourable liquid was possible from biomass. In fact, liquid yields approaching 80% of the weight of the input woody biomass material were possible if the pyrolysis temperatures were moderately raised and the conversion was allowed to take place over a very short time period, typically less than 5 seconds.

The homogeneous liquid product from fast pyrolysis, which has the appearance of espresso coffee, has since become known as bio-oil. Bio-oil is suitable as a fuel for clean, controlled combustion in boilers, and for use in diesel and stationary turbines. This is in stark contrast to slow pyrolysis, which produces a thick, low quality, two-phase tar-aqueous mixture in very low yields.

In practice, the fast pyrolysis of solid biomass causes the major part of its solid organic material to be instantaneously transformed into a vapor phase. This vapor phase contains both non-condensable gases (including methane, hydrogen, carbon monoxide, carbon dioxide and olefins) and condensable vapors. It is the condensable vapours that constitute the final liquid bio-oil product and the yield and value of this bio-oil product is a strong function of the method and efficiency of the downstream capture and recovery system. The condensable vapors produced during fast pyrolysis continue to react in the vapour phase, and therefore must be quickly cooled or "quenched" in the downstream process before they can deteriorate into lower value liquid and gaseous products. As fast pyrolysis equipment is scaled up in commercial operations, particular attention must be given to the strategy and means of rapid cooling, quenching and recovery of the liquid bio-oil product.

SUMMARY OF THE INVENTION

The present invention provides improved rapid thermal conversion processes of biomass by effecting the efficient recovery of high yields of valuable liquid product (e.g., bio-oil) from the vapor phase, on a large scale production.

In an embodiment, biomass material, e.g., wood, is feed to a conversion system where the biomass material is mixed with an upward stream of hot heat carriers, e.g., sand, in a substantially oxygen-free environment in a thermal conversion temperature range between 350 and 600° C. The hot heat carriers contact the biomass material thermally converting the biomass into a hot vapor stream, which is cooled, condensed, and recovered downstream as a liquid product. In a preferred embodiment, the thermal conversion occurs at a temperature of around 500° C. with a resident time of less than 5 seconds, and more preferably less than 2 seconds.

The hot vapor stream is directed to a condensing chamber, or a multiple of condensing chambers, where the hot vapor stream is rapidly cooled from a conversion temperature of approximately 350° C. to 600° C. to a temperature of less than 100° C. in less than 1 s, more preferably to a temperature of less than 50° C. in less than 100 ms, and most preferably to a temperature of less than 50° C. in less than 20 ms. In a preferred embodiment, the upward flowing vapor stream is cooled by rapidly quenching the vapor stream with a downward flow of quench media. This rapid and intimate cooling or quenching by a downward flow of quench media condenses the vapor stream into liquid product. In a preferred embodiment, a portion of the condensed liquid product is drawn out of the condensing chamber, or chambers, cooled and circulated back to the condensing chamber, or chambers, to provide the quench media. The liquid product used for the quench media may be cooled to a temperature of between 30° C. and 50° C. before being circulated back to the condensing chamber. Preferably, the quench media is poured down at a rate of at least 10 gpm/sq. ft (gallon per minute/sq. ft) of the cross-sectional area of the condensing camber, and more preferably at a rate of at least 50 to 100 gpm/sq. ft. The liquid product in the chamber is collected as a valuable liquid product, e.g., bio-oil, that can be used, e.g., for fuel and/or other commercial uses. The processes of the invention are able to produce high yields of valuable liquid product, e.g., approximately 75% or more of the input biomass material.

In an embodiment, a second condensing chamber located downstream of the first condensing chamber is used to condense vapor that evades condensation in the first condensing chamber to increase the yield of liquid product. The second condensing chamber may use the same or different quench media as the first condensing chamber.

In an embodiment, a demister and filter are associated with the first and/or second condensing chambers to remove fine particles from the gas stream exiting the condensing cambers and collect additional liquid product from the gas stream.

Preferably, the conversion and collection process is carried at or near atmospheric pressure, which makes biomass feeding, conversion, and the collection of the liquid product easier and safer. This also allows the biomass to be continuously feed to the conversion system at a high rate facilitating large scale industrial production of the liquid product.

The above and other advantages of embodiments of this invention will be apparent from the following more detailed description when taken in conjunction with the accompanying drawings.

BRIEF DESCRIPTION OF THE DRAWINGS

FIG. 4 is a table showing results for exemplary thermal conversion processes according to embodiments of the present invention.

DETAILED DESCRIPTION

Figure 1:
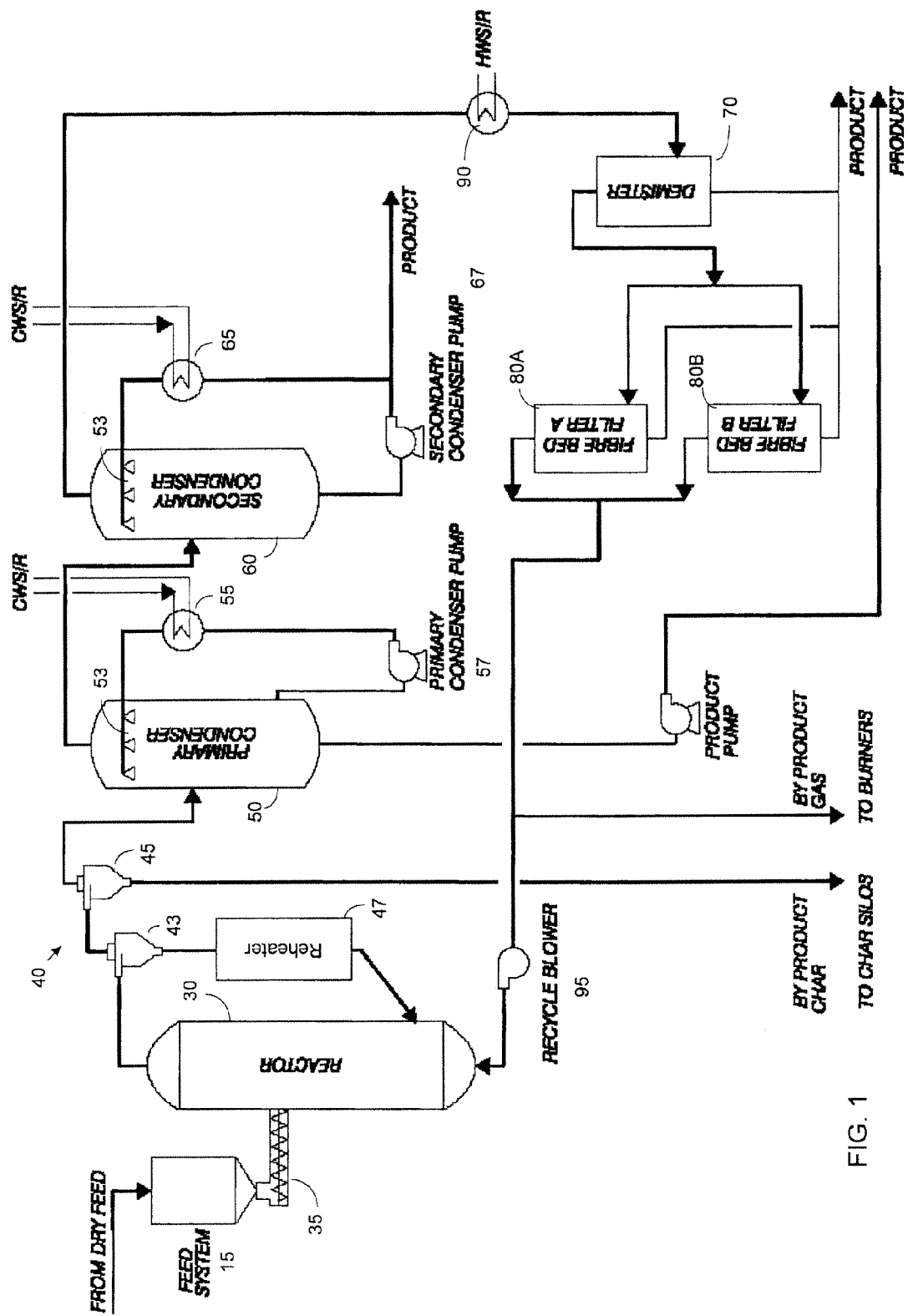
FIG. 1 shows a diagram of a thermal conversion and liquid product collection system according to an exemplary embodiment of the present invention.

FIG. 1 shows a rapid thermal conversion system 10 for converting biomass, e.g., wood, into high yields of liquid product according to an exemplary embodiment of the present invention.

Feed System

Figure 2:
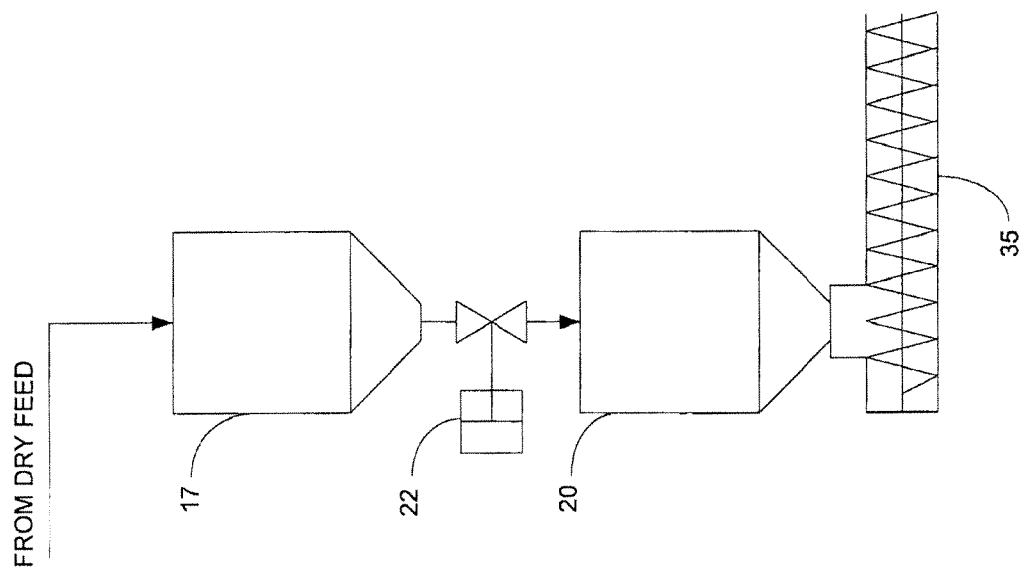
FIG. 2 shows a feed system for feeding biomass feedstock to the thermal conversion system according to an exemplary embodiment of the present invention.

The feed system 15 is used to provide a regulated flow of solid biomass feedstock to the conversion system 10. Preferably, the biomass feedstock is a dry wood feedstock, which may be in the form of sawdust, but liquid and vapour-phase (gas-phase) biomass materials can be effectively processed in the rapid thermal conversion system using an alternative liquid or vapour-phase feed system. Biomass feedstock materials that may be used include, but are not limited to, hardwood, softwood, bark, agricultural and silvicultural residues, and other biomass carbonaceous feedstocks. Embodiments of the invention can also be applied to the conversion of other carbonaceous feedstocks including, but not limited to, plastics, polymers, hydrocarbons, petroleum, coal, and refinery feedstocks. Since the conversion system operates at slightly above atmospheric pressure (i.e., sufficient pressure to overcome the back pressure of the down stream equipment), the feed system 15 should provide material to the conversion system 10 under slight pressure (1.2 atmospheres) while at the same time accepting feedstock material from, e.g., a wood storage silos, which is at atmospheric pressure. To achieve a continuous supply of feedstock in this manner a lock-hopper system is utilized, which is shown in greater detail in FIG. 2.

The feed system 10 comprises a feedstock surge bin 17, a feed bin 20, and a transfer valve 22, e.g., knife gate valve, between the surge bin 17 and feed bin 20. The valve 22 provides isolation of the surge bin 17 from the feed bin 20, and preferably comprises an elastomer seat to ensure a gas tight seal. The valve 22 allows filling of the surge bin 17 with feedstock under atmospheric conditions while maintaining a seal in the feed bin 20 so that the feed bin 20 can operate at above atmospheric pressure.

The feedstock surge bin 17 is preferably a cylindrical vessel constructed of carbon steel and has a capacity that is sufficient to hold enough feedstock, e.g., for approximately 30 minutes of feedstock transfer before refilling. The surge bin 17 is equipped with a bottom-out feed system and internal bridge-breaking device used to dislodge held-up biomass material. Examples of bridge breaking devices include a sweep-arm with or without finger projections, vibration devices, swing chains, and the like. The rate of feedstock discharge from the surge bin 17 may be fixed and a full transfer cycle completed within approximately 10 minutes. Three level sensors (high level switch high, low level switch low, and low-low level switch) may be used to activate feedstock transfer. In addition, continuous monitoring of the feedstock material level in the surge bin 17 may be achieved with a level transmitter. When the level of material in the surge bin 17 drops to activate the low level switch, feedstock material will automatically be transferred from the feedstock storage system (not shown) to the surge bin 17. The high level switch is used to indicate when the surge bin is full and the material transfer from the feedstock storage system is terminated. The low-low switch is a back-up switch to indicate that the bin is empty when the low level switch is not triggered. This may occur, e.g., when material holds up on the low level switch giving a false reading. The valve 22 is closed when the surge bin is being filled.

When the level in the feed bin 20 reaches the lower level switch, feedstock material is automatically transferred from the surge bin 17 to the feed bin 20. Prior to opening the valve 22, the pressure of the surge bin 17 is equalized with the feed bin 20. The feedstock material can be transferred from the surge bin 17 to the feed bin 20 by direct transfer when the surge bin 17 is located directly above the feed bin 20 and the valve 22 is opened. Alternatively, if the bins are off-set, then an auger or screw feeder system (not shown) can be used to transfer material from the surge bin 17 to the feed bin 20. The auger or screw can be horizontal or inclined depending on the relative orientation of the two bins. The feed bin 17 is preferably constructed of carbon steel and is equipped with a volumetric bottom-out feeder. The volumetric feeder provides a metered flow of material to a constant speed conversion inlet screw conveyor 35, which transfers the material to the conversion system 10. The operator can adjust the desired flow of material by adjusting the speed of the screw conveyor 35. To provide feedstock conditioning, an internal bridge-breaking system is incorporated.

The constant speed screw conveyor 35 is constructed of stainless steel and is provided with high temperature seals and bearings. The conveyor 35 may operate at a constant speed and is capable of discharging material into the conversion system 10 at a higher rate than is being provided by the volumetric feeder. This ensures a homogeneous, dispersed flow of material. For safety, the outlet of the screw 35 is fitted with an emergency isolation knife valve and water quench system.

Thermal Conversion System

The thermal conversion system 10 includes a reactor 30 that mixes the feedstock with an upward flowing stream of hot heat carriers, e.g., sand, in a mixing zone. The reactor is essentially oxygen free. The feedstock enters the reactor 30 just below the mixing zone and is contacted by the upward flowing stream of hot heat carriers (sand) and their transport fluid (recycle gas). The result is thorough and rapid mixing and conductive heat transfer (including ablation) from the heat carriers to the feedstock. The hot heat carriers instantly flash the feedstock into a hot vapor, which is cooled, condensed, and recovered downstream as a liquid product.

Thermal conversion of the feedstock is initiated in the mixing zone under moderate temperatures, e.g., approximately 500° C. (approximately 930° F.) and continues through to the separation system 40 located downstream of the reactor 30. The resident time in the reactor is preferably less than 5 seconds, and more preferably less than 2 seconds. The solid heat carriers along with by-product char are removed from the product vapor stream in the separation system 40. Preferably, the separation system is fitted with high-abrasion resistant liner to minimize the likelihood of premature failure. The product vapor stream passing through the separation system 40 is directed to the downstream liquid product recovery system 50.

Figure 3:
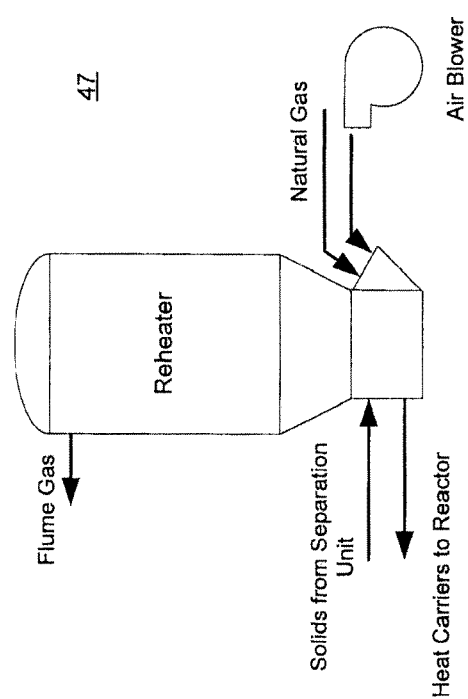
FIG. 3 shows a reheater for reheating heat carriers according to an embodiment of the present invention.

In the embodiment shown in FIG. 1, the separation system 40 comprises two cyclonic separators 43 and 45. The first cyclonic separator 43 separates the solid heat carriers and by-product char from the product stream. The solids that have been removed in the first separator 43 are directed to a reheater unit 47. The second separator 45 removes char that is not removed in the first separator 43. The reheater unit 47 is shown in greater detail in FIG. 3.

In the reheater unit 47, the by-product char is converted by the addition of air to heat and combustion gases. Typically, there is more than sufficient heat generated by the combustion of by-product char and gas to satisfy the heat requirements of the thermal conversion process (external fuels, such as natural gas, are rarely used and typically for system start-up alone). The excess heat from the reheater can be productively used for other purposes, including biomass drying, steam generation, space heating, power generation, etc. The heat generated in the reheater elevates the temperature of the solid heat carriers, which can then be transferred to the feedstock material in the reactor 30 to achieve the necessary reaction temperatures.

Liquid Product Collection System

The hot vapor product stream from the solids separation system 40 is directed via an insulated duct to a primary collection column or condensing chamber 50. Preferably, the hot vapor stream is brought from a conversion temperature of approximately 350° C. to 600° C., to less than 100° C. in less than 1 s. More preferably, the hot vapor stream is reduced to less than 50° C. in less than 0.1 s (100 ms), and most preferably to a temperature of less than 50° C. in less than 20 ms. The primary collection column 50 is equipped with a liquid distributor 53 located in the upper portion of the column 50. Cooled liquid product or other appropriate quench media (e.g., water, diesel, other petroleum based liquid, polysorbate, etc) is circulated through the distributor 53 and allowed to "rain" down on the incoming vapor stream. Various types of distributor systems can be employed. Examples include, but are not limited to, vane, pipe, chimney, finger distributor, spray head, nozzle design, trays, packing, etc. Preferably, at least 10 gpm/sq. ft (gallons per minute/sq. ft) of column cross-sectional diameter of quench liquid is circulated through the collection column. More preferably, at least 50 to 100 gpm/sq. ft of column cross-sectional diameter of quench liquid is circulated through the collection column. The dense stream of liquid raining down the column not only serves to immediately cool and quench the incoming vapor but also provides nucleation sites for the collection of the liquid product. Typically, the hot vapor enters the collection column 50 just above the normal operating level of the collected liquid in the column 50. The vapor not collected in the primary collection column 50 along with the non-condensable gas exit the column 50 through a top exit port 55. This mode of operation is counter-current. In another mode of operation in which it is desired to minimize the length of the hot vapor piping the hot vapor enters through the upper portion of the column 50 and the vapor not collected in the column 50 along with the non-condensable gas exit through a port situated in the lower portion of the column (just above the normal liquid level). This mode of operation is co-current. The column 50 may be equipped with a demister in the gas exit section of the column to reduce the carryover of liquid droplets into the second collection column 60.

Condensed liquid that has associated with the down flowing atomized quench stream accumulates in the lower portion of the column 50. In addition, heavy condensed droplets fall to the lower portion of the column 50 due to gravitational sedimentation. Level transmitters in the column 50 are used to monitor and maintain the desired liquid levels. In an embodiment, a portion of the liquid product is drawn out from the column 50 and pumped by a condenser pump 57 through a heat exchanger 58 to cool the liquid product to, e.g., 30 to 50° C. The cooling medium for the heat exchanger 58 can be water. Other cooling means may be employed including a glycol system, an air cooler, or the like. The cooled liquid product is circulated back to the column distribution system 53 to provide the quench media for the incoming vapor stream.

The liquid product in the collection column is pumped out to product storage tanks (not shown) to maintain the desired liquid level. The collected liquid product provides a valuable liquid product, bio-oil, that can be used, e.g., for fuel and/or other commercial uses.

The vapor is rapidly quenched because the vapor and liquid product are thermally labile (chemically react at higher temperatures). By using a high liquid recirculation/quench rate, the incoming vapor is rapidly quenched, which avoids undesirable chemical reactions such as polymerization that occur at higher temperatures. Further, the high recirculation rate of the liquid product used for the quench media prevents the quench media from reaching undesirably high temperatures.

The vapor not collected in the primary collection column 50 or vessel is directed to a secondary collection column 60 (secondary condensing column). Again as was the case for the primary condensing column 50 the collected product liquid is used as a quench media via an overhead distribution system 53. Preferably, at least 10 gpm/sq. ft of column cross-sectional diameter of liquid is circulated through the column 60. More preferably, at least 50 to 100 gpm/sq. ft of column cross-sectional diameter of quench liquid is circulated through the column 60. The column 60 may be equipped with a demister in the gas exit section of the column 60 to reduce the carryover of liquid droplets, mist or aerosols into the downstream demister or filtering systems. The cross-sectional diameter of this column 60 may be the same as the primary collection column 50. However, it is typically smaller in diameter since greater superficial gas velocities will facilitate the removal of the fine droplets or aerosols in the demister section of the column 60.

Mist, aerosols and non-condensable gas that exit the secondary collection column 60 are directed to a separate demister system 70. If the secondary collection column 60 is equipped with an internal demister unit, then the downstream separate demister may not be required. The demister system 70 preferably removes mist droplets that are greater than 3 microns. These droplets tend to be captured in the demister by inertial impaction. The particles, which are traveling in the gas stream, are unable to abruptly change direction along with the gas as the flow goes through the demisting system 70 due to their weight. As a result, they impact the fibers of the demister and are subsequently captured. Mist particles that come in contact with the demister fibers adhere by weak Van Der Waals forces. The accumulating impacting mist droplets tend to join together to form larger single droplets that finally fall to the lower portion of the demister vessel due to gravitational sedimentation.

The demister system 70 may comprise a series of mist eliminator units. The first unit is a vane mist eliminator which can remove about 99% of the mist as low as 10 microns. Next is a stainless steel wire mesh pad having a density of about 5 lbs/ft$^3$ and a wire diameter of 0.011 inches (surface area of 45 ft$^2$/ft$^3$, and 99.0% voids). Other materials may be used besides steel including glass, alloy 20, Teflon, polypropylene, or the like. This is followed by a 9 lb/ft$^3$ stainless steel wire mesh pad, again 0.011 inch diameter (surface area of 85 ft$^2$/ft$^3$, and 98.0% voids). The final mist eliminator unit is a co-knit style comprising a metal wire construction with fiberglass. The pad is 9 lb/ft$^3$ with a wire diameter of 0.00036 inches (surface area of 3725 ft$^2$/ft$^3$, and 99.0% voids).

Fine aerosols (i.e., less than approximately 3 microns), condensed particles of greater than 3 microns that evaded the demister system 70, and non-condensable gas from either the secondary condensing column 60 or the demister system 70 pass to a final filtering system 80. The filter system 80 may comprise two fiber beds 80A and 80B set up in parallel, as shown in FIG. 1. Again, as was the case with the demister system 70, particles larger than about 3 microns are captured by inertial impaction. Condensed particles between 1 and 3 microns tend to be captured through interception in which the particles follow the non-condensable gas stream line that comes within about one particle radius of the surface of a fiber. Particles of less than 1 micron are captured through diffusion or Brownian movement in which the particles have a tendency to attach themselves to the fibers of the filter 80 due to their random motion. Again, captured particles tend to join together to form larger liquid droplets. However, the pressure drop across the filter 80 may exceed predetermined limits before a sufficient quantity of material has drained to the lower section of the filter vessel. In addition, re-entrainment of collected material can occur as the localized loading of liquid increases the effective open cross-sectional area of the filter decreases thereby increasing the flow of gas through the remaining open areas. This increase flow of gas leads to increased velocities that can lead to higher than desired pressure drops and possibly re-entrainment, and loss of captured liquid. Therefore, the filtering system 80 can consist of more than one filter unit which can be set up in parallel or in series as required. Typically two filter units 80A and 80B are employed in parallel in which one filter unit is on-line at any one time. A filter unit may remain on-line for a period of about 8 to 24 hours (typically 12 hours). When the filter unit is switched off-line it is allowed to drain. The pressure drop across the filter unit can also dictate the period of time that the unit is allowed to remain on-line. Pressure drops that exceed predetermined limits (typically 100 inches of water column) can lead to failures of the filter elements (i.e., tear holes can develop in the fabric) of the filter unit.

Since the collected mists and aerosol liquid can tend to be relatively viscous at ambient conditions a reheat exchanger 90 can be employed between the secondary condenser column 60 and the demister 70 and fiber bed filters 80A and 80B. Alternatively, if the demister is incorporated in the secondary condenser column 60, the reheat exchanger will be installed upstream of the fiber bed filters 80A and 80B only. This reheat exchanger 90 is used to slightly elevate the temperature of the vapor stream (up to about 60-65° C.) and enable a sufficient viscosity reduction of the captured liquids in the downstream systems 70 and 80 to allow adequate drainage.

The gas filtered through the filter system 80 is recycled back to the reactor 30 by reactor blower 95. The recycled gas provides the transport fluid for the upward flow of hot carriers in the mixing zone of the reactor 30.

Results for exemplary thermal conversion processes according to embodiments of the present invention will now be discussed. In these examples, the primary and secondary collection columns each had a diameter of approximately 4 feet. The feed rate of biomass material into the conversion system varied between approximately 2650 to 3400 lb/hr. The temperature of the incoming vapor was approximately 500° C. with a flow rate of approximately 1100 standard cubic feet per minute (scfm). In these examples, a portion of the liquid product in each collection column was cooled and circulated back to the collection column to provide the quench media. Table 1 below shows quench temperatures and recirculation rates for nine exemplary process parameters. The quench temperature is the temperature of the cooled liquid product prior to injection back to the collection column, and the recirculation rate is the flow rate of the liquid product at the top of the collection column.

TABLE 1

Quench Temperatures and Recirculation Rates

| EXAMPLE | BIO-OIL QUENCH TEMPERATURE (° C.) | BIO-OIL RECIRCULATION RATE (GPM) |
|---|---|---|
| 1 | 36 | 750 |
| 2 | 30 | 760 |
| 3 | 41 | 715 |
| 4 | 36 | 670 |
| 5 | 30 | 675 |
| 6 | 41 | 675 |
| 7 | 36 | 625 |
| 8 | 30 | 625 |
| 9 | 41 | 625 |

Results for the nine examples are shows in Table 2 in FIG. 4. Each exemplary process was conducted over a period of approximately 12 hours. Table 2 shows the percentage distribution of bio-oil collected in the primary and secondary collection columns or condensers, in which the collection in the secondary collection column included bio-oil collection from the demister and fiber bed filters. Table 2 also shows properties of the bio-oil collected from the primary and secondary collection columns.

Although the present invention has been described in terms of the presently preferred embodiments, it is to be understood that the disclosure is not to be interpreted as limiting. Various alterations and modifications will no doubt become apparent to those skilled in the art after having read this disclosure. Accordingly, it is intended that the appended claims be interpreted as covering all alterations and modifications as fall within the spirit and scope of the invention.

What is claimed is:

1. A method, comprising:
   i) forming a vapor stream by fast pyrolysis of a biomass at a conversion temperature of between 350 and 600° C.; and
   ii) rapidly quenching the vapor stream with a quench media from a temperature of between 350 and 600° C. to a temperature of less than 100° C. in less than 1 second.

2. The method of claim 1, wherein the method is continuous.

3. The method of claim 1, wherein at least a portion of the vapor stream is condensed to form a liquid product in a condensing chamber.

4. The method of claim 3, wherein the quench media comprises at least a portion of the liquid product.

5. The method of claim 4, wherein the quench media is at a temperature of between 30 and 50° C.

6. The method of claim 3, further comprising: continuously providing the quench media.

7. The method of claim 6, wherein the vapor stream is rapidly quenched with a downward flow of the quench media.

8. The method of claim 7, wherein the downward flow of the quench media is at a rate of at least 10 gallons per minute per square foot of cross-sectional area of the condensing chamber.

9. The method of claim 7, wherein the quench media comprises at least a portion of the liquid product.

10. The method of claim 9, wherein the quench media is cooled to a temperature of between 30 and 50° C. prior to rapidly quenching the vapor stream.

11. The method of claim 9, wherein the method is continuous.

12. The method of claim 11, wherein the vapor stream is rapidly quenched at or near atmospheric pressure.

13. The method of claim 1, wherein the vapor stream is formed in less than 2 seconds.

14. The method of claim 1, wherein the vapor stream is at a temperature of between 350 and 600° C.

15. The method of claim 1, wherein the vapor stream is quenched to a temperature of less than 50° C. in less than 0.1 seconds.

16. The method of claim 15, wherein the vapor stream is quenched to a temperature of less than 50° C. in less than 0.02 seconds.

17. The method of claim 1, wherein the biomass is a solid biomass.

18. The method of claim 1, wherein the biomass is selected from the group consisting of: wood, wood residue, and combinations thereof.

19. A method, comprising:
   i) continuously providing a vapor stream to a condensing chamber, the vapor stream formed by fast pyrolysis of a solid biomass in less than 2 seconds at a conversion temperature of between 350 and 600° C.;
   ii) continuously providing a quench media to the condensing chamber;
   iii) rapidly quenching the vapor stream with a downward flow of the quench media in the condensing chamber from a temperature of between 350 and 600° C. to a temperature of less than 50° C. in less than 0.1 second; and
   iv) condensing at least a portion of the vapor stream to form a liquid product in the condensing chamber,
   wherein the quench media comprises a cooled liquid product formed by collecting the liquid product from the condenser and cooling at least a portion of the collected liquid product to a temperature of between 30 and 50° C.

20. The method of claim 19, wherein the biomass is selected from the group consisting of: wood, wood residue, and combinations thereof.

* * * * *